United States Patent [19]
Bodzin

[11] Patent Number: 5,551,349
[45] Date of Patent: Sep. 3, 1996

[54] INTERNAL CONDUIT VEHICLE

[75] Inventor: Leon J. Bodzin, San Diego, Calif.

[73] Assignee: The United States of America as represented by the Secretary of the Navy, Washington, D.C.

[21] Appl. No.: 496,827

[22] Filed: Jun. 29, 1995

[51] Int. Cl.⁶ .................................................. B61B 13/00
[52] U.S. Cl. ............................................................ 104/138.2
[58] Field of Search ............................ 104/138.2, 138.1; 301/5.23; 180/7.1, 7.2, 21

[56] References Cited

U.S. PATENT DOCUMENTS

| | | | |
|---|---|---|---|
| 3,004,278 | 10/1961 | Stanley . | |
| 3,089,434 | 5/1963 | Andreasen | 104/138.2 |
| 3,099,227 | 7/1963 | Bryan . | |
| 3,295,700 | 1/1967 | Ziegler . | |
| 3,847,353 | 11/1974 | Wynne, II . | |
| 3,876,255 | 4/1975 | Ilon . | |
| 3,890,905 | 6/1975 | Clavin . | |
| 4,055,315 | 10/1977 | Gvelesiani et al. | 104/138.2 |
| 4,223,753 | 9/1980 | Bradbury . | |
| 4,237,990 | 12/1980 | La . | |
| 4,457,236 | 7/1984 | Akhmadiev et al. . | |
| 4,598,782 | 7/1986 | Ilon . | |
| 4,654,702 | 3/1987 | Telino et al. | 104/138.2 |
| 4,677,865 | 7/1987 | Lehmann | 104/138.2 |
| 4,722,001 | 1/1988 | Rohrich et al. | 104/138.2 |
| 4,770,105 | 9/1988 | Takagi et al. . | |
| 4,907,692 | 3/1990 | Sogge . | |
| 5,018,451 | 5/1991 | Hapstack | 104/138.2 |
| 5,142,989 | 9/1992 | Suzumori et al. | 104/138.2 |

FOREIGN PATENT DOCUMENTS

| | | | |
|---|---|---|---|
| 0120168 | 5/1990 | Japan | 104/138.2 |
| 0162152 | 6/1990 | Japan | 104/138.2 |
| 4118353 | 4/1992 | Japan | 104/138.2 |
| 1548098 | 3/1990 | U.S.S.R. | 104/138.2 |

OTHER PUBLICATIONS

Adams, "Omnidirectional Vehicle", *Robotics Age*, Feb. 1984, pp. 21–22.

"Omni–Directional Vehicles Designed for Optimal Maneuverability", *Navy Domestic Technology Transfer Fact Sheet*, vol. 18, No. 10, Oct. 1993.

*Primary Examiner*—Mark T. Le
*Attorney, Agent, or Firm*—Harvey Fendelman; Peter A. Lipovsky; Michael A. Kagan

[57] ABSTRACT

An internal conduit vehicle comprises two coaxially aligned dual-vector wheels mounted to each end of a chassis. The wheels include multiple, elongated rollers each positioned at an angle around a hub assembly. Two motors mounted to opposite ends of the chassis are rotationally coupled to a hub assembly. A motor control system mounted to the chassis drives the motors so that the wheels counter-rotate with equal, but opposite torque, thereby driving the vehicle axially through a conduit.

5 Claims, 8 Drawing Sheets

INTERNAL CONDUIT VEHICLE

BACKGROUND OF THE INVENTION

The present invention relates to the field of vehicles which travel within pipes, and more particularly, to a vehicle having counter-rotating, dual-vector wheels which can drive the vehicle both vertically and horizontally through a pipe.

Since the early 1970's, internal pipeline vehicles have routinely performed pipe inspections in the oil, gas, and nuclear power industries. Internal conduit vehicles have been designed with conventional circular wheels pressed against the internal surface of the pipe. U.S. Pat. No. 3,890,905, describes a vehicle designed to travel inside a pipe. The vehicle includes a pair of counter-rotating drive members around which circular wheels are attached. The spin axes of the wheels are angled with respect to the axis of the pipe so that rotation of the drive members produces a driving force which causes the vehicle to move through the pipe. The drive wheels are spring loaded to maintain constant contact between the wheels and the interior walls of the pipe. The angles of the spin axes of each wheel provide the vehicle with both rotational and axial thrust as the drive members rotate. One limitation of circular wheels is that they tend to provide insufficient traction for pulling massive loads and for enabling the vehicle to travel vertically through the pipe. Many pipelines have horizontal sections of different elevations, requiring vertical or at least inclined transitions between the sections. Present internal pipe inspection vehicles generally cannot traverse such transitions. Therefore, many sections of pipes cannot be readily inspected.

A need therefore exists for a vehicle capable of pulling increased loads and for traveling vertically through a pipe.

DESCRIPTION OF THE DRAWINGS

Throughout the several figures, like elements are referenced with like designations.

SUMMARY OF THE INVENTION

An internal conduit vehicle comprises two coaxially aligned dual-vector wheels mounted to each end of a chassis. The wheels include multiple, elongated rollers each positioned at an angle around a central hub assembly. A motor is mounted to the hub assembly of each wheel and to each end of the chassis. A motor control system mounted to the chassis provides power and controls the motors so that the wheels counter-rotate with equal, but opposite torque, thereby driving the vehicle axially through a pipe. An important feature of the invention is that the rollers are mounted on extendable pin support brackets which slide in and out of the hub assembly to maintain good contact between the rollers and the inside surface of the pipe. The extendable pin support brackets allows the vehicle to adapt to varying inside diameters and surface irregularities of the pipes. Further, the wheels provide superior traction, allowing the vehicle to travel vertically through a pipe.

In an other aspect of the invention, the internal conduit vehicle may be inserted within a pipe or a conduit to provide an internal conduit vehicle system. One application of the invention, given by way of example, would be to provide a system for transporting equipment through a pipe or conduit.

The invention also provides a novel dual-vector wheel, comprising a hub assembly, multiple rollers mounted to pivot about the hub assembly, and multiple pairs of pin support brackets. Each pair of pin support brackets supports one of the rollers. An important feature of the invention is that the pin support brackets all may slide inwardly and outwardly from the hub so that the rollers may maintain good contact with the surface on which the wheel is traversing. A motor system mounted to the hub may be attached to a chassis to resist motor torque and thereby facilitate rotation of the hub.

DESCRIPTION OF THE PREFERRED EMBODIMENT

Figure 1:
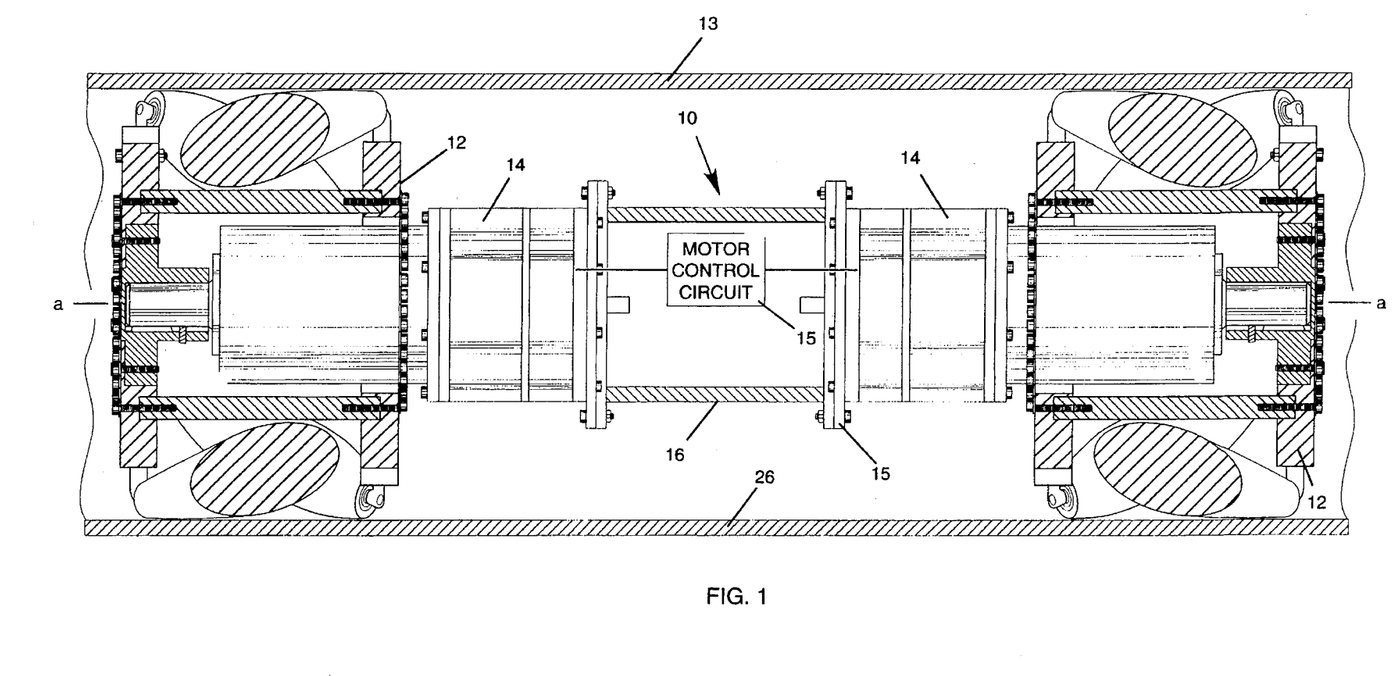
FIG. 1 is a cross-sectional view of an internal conduit vehicle embodying various features of the present invention.

The present invention provides an internal conduit vehicle 10, as shown in FIG. 1, which includes a pair of coaxially aligned, dual-vector wheels 12 which drive the vehicle through a conduit or pipe 13. The two wheels 12 are each driven by motors 14 mounted to opposite ends of a chassis 16. The motors 14 are powered and controlled by a motor control system 15 whereby the wheels counter-rotate with equal torque so that the vehicle is driven axially through the pipe 13. The motor control system 15, shown in greater detail in FIG. 4 includes a "master" motor control system 15a and a "slave" motor control system 15b. The wheels 12 are mounted to the chassis 16 so that they are mirror images of each other. The wheels 12 may preferably be of the type described in U.S. Pat. No. 3,876,255, "Wheels For A Course Stable Self Propelling Vehicle Movable In Any Direction On The Ground Or Some Other Base," incorporated herein by reference.

Figure 2:
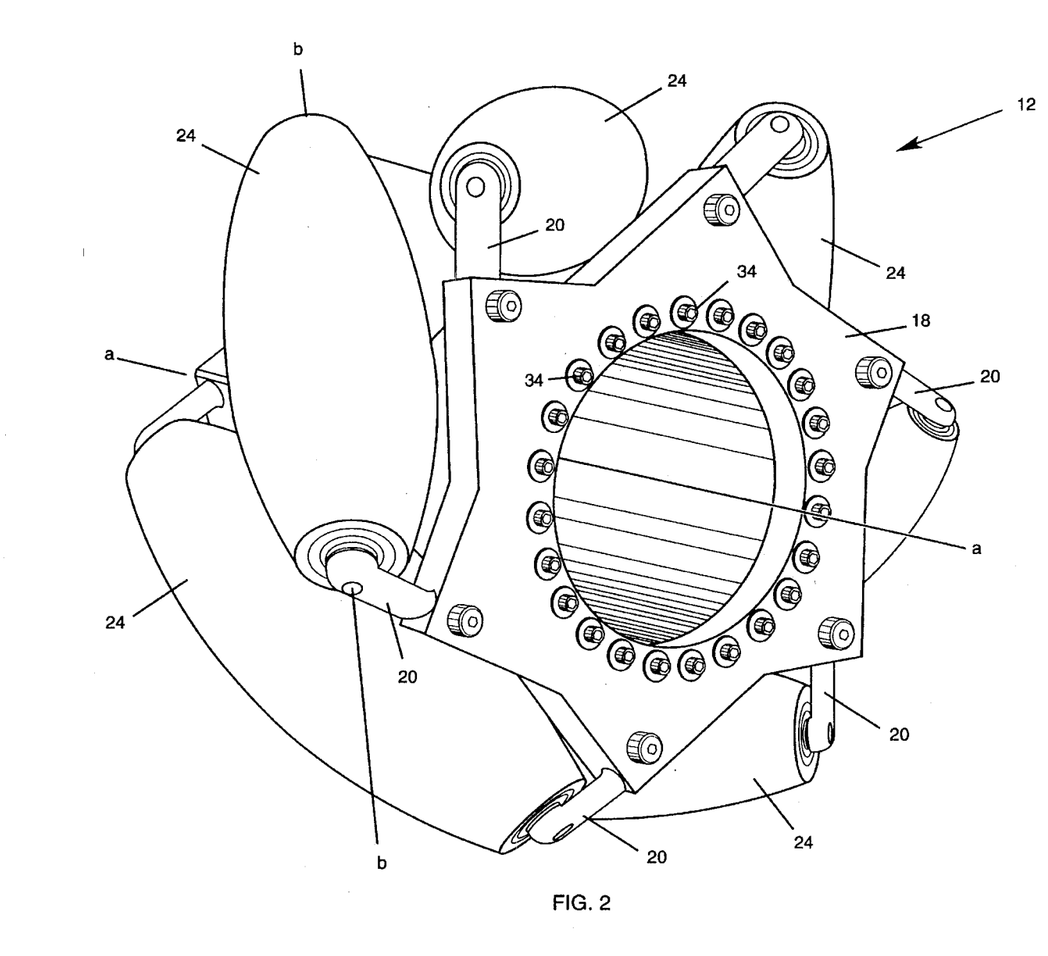
FIG. 2 is a three-quarter view of a dual-vector wheel.

FIG. 2 shows a perspective view of a wheel 12 which may be selectively controlled to travel axially through a conduit 13 by rotating about its rotational axis a—a. The wheel 12 includes a hub assembly 18 on which are mounted multiple extendable pin support brackets 20. Each pair of the support brackets 20 support an elongated roller 24 so that it pivots about an axis fixed with respect to the hub assembly 18. The rollers 24 each rotate about their own spin axes b—b (only one axis b—b is illustrated) which are to be distinguished from the spin axis a—a (FIG. 2) of the wheel 12. Each axis b—b defines an angle which may be in the range of 30 to 160 degrees with respect to the center spin axis a—a, as described at column three, lines 40–46 of U.S. Pat. No. 3,876,255, or more generally be in the range of 0–180 degrees. However, it is to be understood that whatever angle is selected for the axis b—b, the axes b—b for each roller 24 should all be at the same angle. As seen in FIG. 2, the wheel 12 is shown to include six rollers 24. However, it is to be understood that the wheel may be implemented with any integral number of two or more rollers. In the case of a wheel 12 having only two rollers, the rollers 24 would not overlap. In the case where the wheel 12 has three or more rollers 24, the rollers may overlap, or may not overlap, to suit the requirements of a particular application. The rollers 24 each have an outer profile which provides optimum contact, and hence traction, with the inside surface 26 of the conduit 13 FIG. 1). The profiles of the rollers are described in greater detail further herein.

An important innovative feature of the wheel 12, explained in greater detail further herein, is that the pin support brackets 20 are independently extendable. This feature allows the rollers 24 to maintain optimum contact with the inside surface 26 (FIG. 1) of the conduit 13, particularly, in cases where the inside diameter of the conduit changes, either as a result of design choice, the accumulation of debris, or from manufacturing deviations in the pipe, or from uneven transitions between conduit sections.

Figure 3:
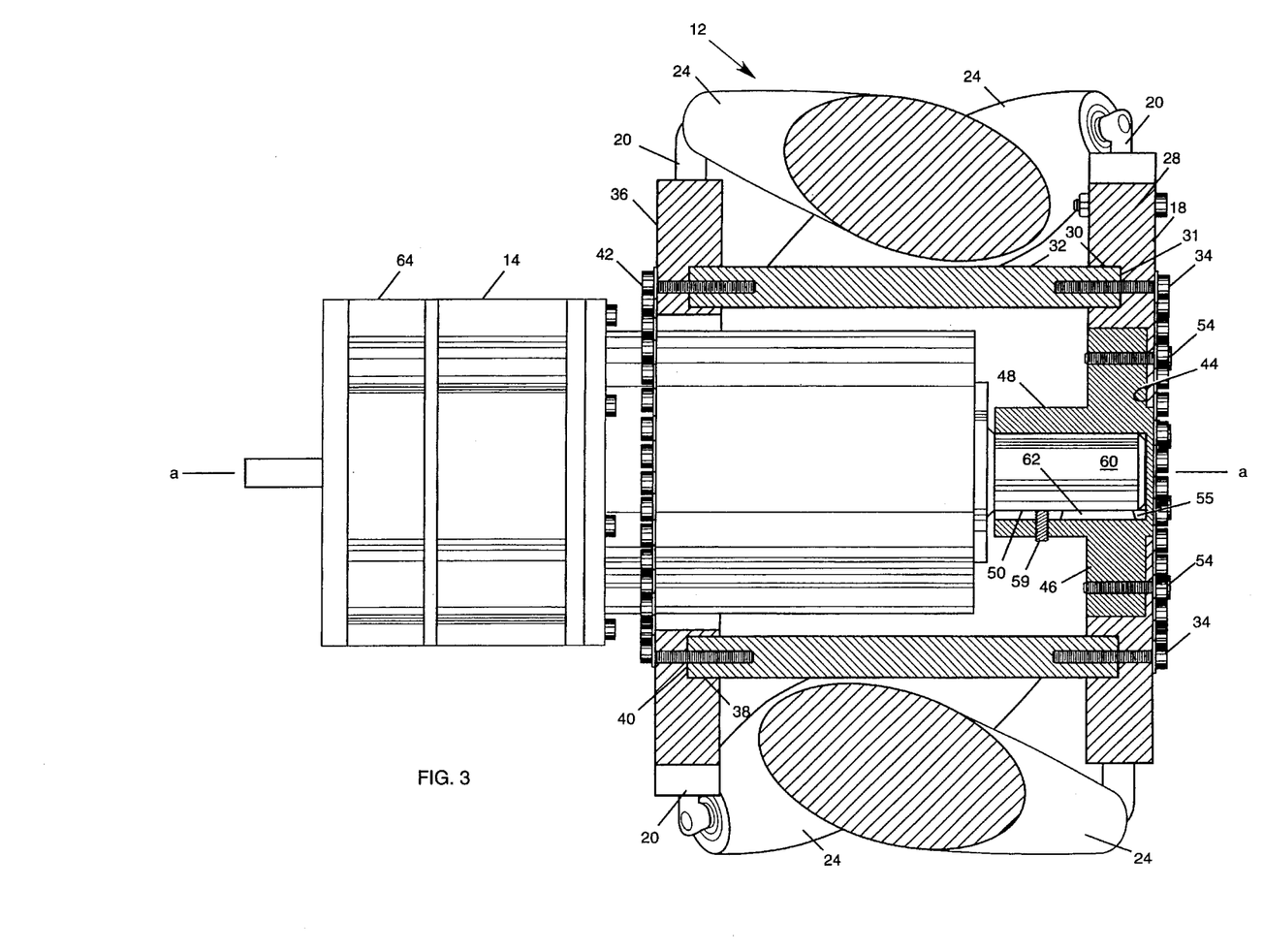
FIG. 3 is a cross-sectional view of the dual-vector wheel of FIG. 2.

In one example of the present invention, the wheel 12 may be constructed as shown in FIG. 3, whereby the hub assembly 18 includes an outer flange 28 having an annular groove 30 in which is fitted the end 31 of a cylindrical tube 32. The tube 32 is held within the grove by threaded fasteners 34 which extend through the outer flange 28 and engage the tube. The hub assembly 18 also includes an inner flange 36 having an annular groove 38 in which is fitted the other end 40 of the cylindrical tube 32. Threaded fasteners 42 extending through the inner flange 36 engage the inner end of the cylindrical tube 32 within the annular groove 38. The outer flange 28 includes a circular land 44 to which a center hub assembly 46 is attached by threaded fasteners 54. A boss 48 extending from the center hub assembly 46 includes a bore 50 having a keyway 55 sized to engage the output shaft 60 of the motor 14.

Each wheel 12 is driven by a motor 14 having an output shaft 60 positioned within the bore 50 and fixed to rotate with the hub assembly 18 by the keyway 62. Setscrew 59 locks the shaft 60 within the bore 50. An encoder 64 mounted to the end of the motor 14 detects the angular displacement of the output shaft 60. The angular displacement of the output shaft 60 of each motor 14 22 provides feedback to motor control system 15 which controls the current supplied to each motor 14 so that the wheels 12 (FIG. 1) generate opposed torque of equal magnitude. By way of example, the motor 14 and encoder 64 may be of the type associated with Model S6M4H/M23/HD100 servo-disc motor with harmonic drive and encoder, manufactured by PMI Motors, Kollmorgen Corporation, Syosset, N.Y.

Figure 4:
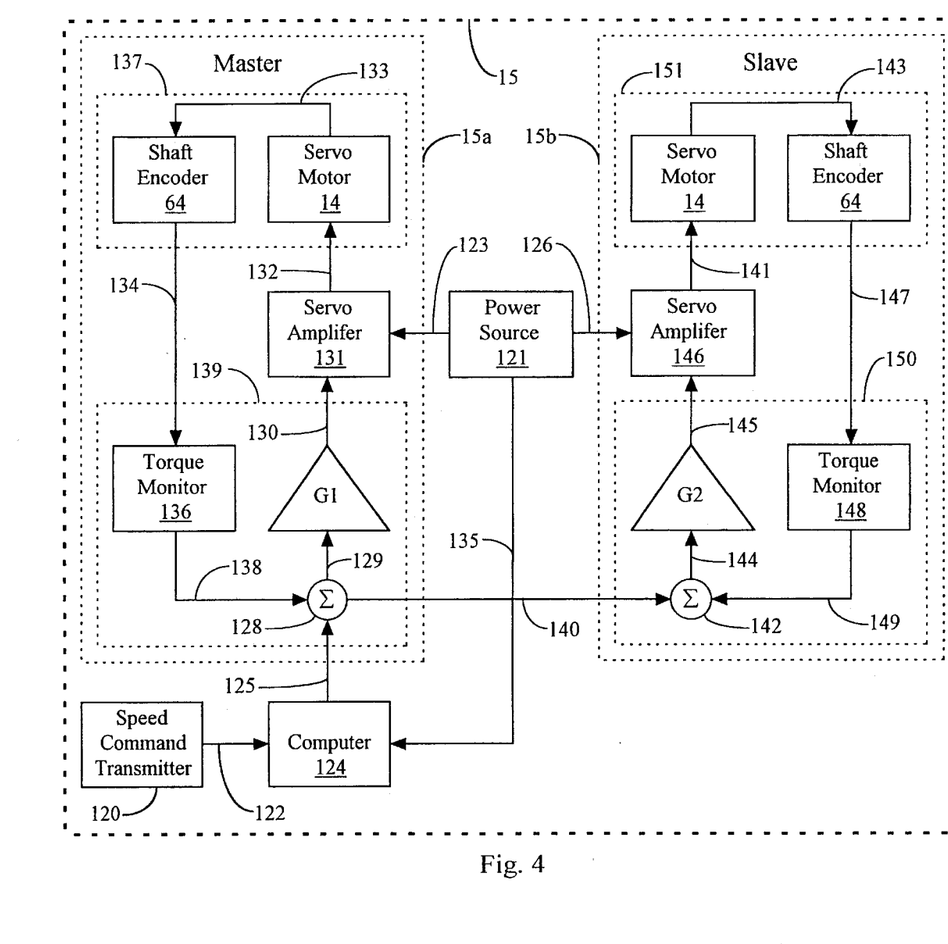
FIG. 4 is a block diagram of the motor control system.

Referring now to FIG. 4, motor control system 15 generally provides a torque monitoring system which equalizes the torque generated by the motors 14. The torque output of each motor 14 is determined from the angular displacement of the motor's output shaft 60 by a corresponding encoder 64.

The motor control system 15 includes a speed command transmitter 120 for generating a speed and direction command signal 122 which is provided to computer 124. By way of example, the signal 122 may be a radio frequency signal or a signal propagated by a cable, not shown, between the transmitter 120 and computer 124. The computer 124 generates a command output signal 125 that is provided to a voltage summing node 128. The node 128 provides a voltage signal 129 to a gain element G1, such as an operational amplifier, which generates an amplified voltage signal 130 that is received by the corresponding servo-amplifier 131. Power source 121, such as a battery, provides electrical power signal 123 to "master" servo-amplifier 131 for voltage amplification proportional to the amplified voltage signal 130. Amplified voltage signal 132 generated by "master" servo-amplifier 131 powers "master" motor 14. A shaft coupling 133 couples the output shaft 60 of the "master" motor 14 to the corresponding "master" encoder 64. "Master" encoder 64 converts angular displacement of output shaft 60 into an output voltage signal 134 that is received by torque monitoring element 136, which may be implemented as an EPI Motion Systems, Inc. Model SMC/104TM, single axis servo controller with torque monitoring. Torque monitoring element 136 uses signal 134 to produce voltage signal 138 which is proportional to the torque produced by "master" motor 14.

Voltage node 128 sums the signals 125 and 138 to produce signal 140 which is provided to summing node 142 of "slave" control system 15b which generates an output signal 144 which is the sum of signal 140 and the input of signal 149, generated by torque monitoring element 148. Gain element G2, which may be an operational amplifier, generates an amplified voltage signal 145 which is provided to servo-amplifier 146. Power source 121 also provides electrical power signal 126 to "slave" servo-amplifier 146 for voltage amplification proportional to the amplified voltage signal 145. Amplified voltage signal 141 generated by "slave" servo-amplifier 146 powers "slave" motor 14. A shaft coupling 143 couples the output shaft 60 of the "slave" motor 14 to the corresponding "slave" encoder 64. "Slave" encoder 64 converts angular displacement of output shaft 60 into an output voltage signal 147 and is received by torque monitoring element 148. Torque monitoring element 148 uses voltage signal 147 to produce voltage signal 149, provided as feedback to summing element 142. Power source 121 also provides a power signal 135 to computer 124.

A principal object of the invention is to provide continuous contact between the rollers 24 and the internal surface 26 of the conduit 13. Such continuous contact is achieved by providing appropriate surface curvature for each roller 24 so that the perpendicular cross-section of a roller at any position along the length of its axis b—b provides a tangential contact point with the inner surface 26 of the conduit 13. This constraint results in a condition of maximal surface friction, or traction between the roller 24 and the internal surface 26 of the conduit 13 sufficient to allow the internal conduit vehicle 10 to travel horizontally or vertically, either up or down, through the conduit 13.

Figure 5:
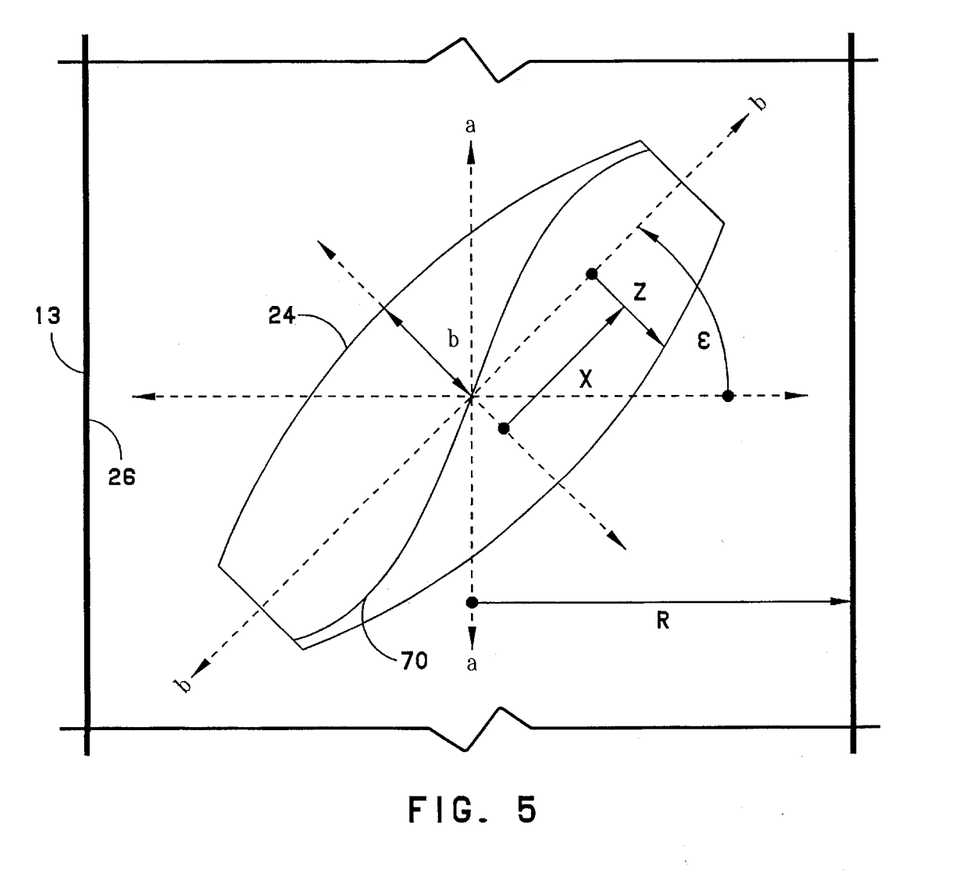
FIG. 5 illustrates the geometry of the contact area between the roller of the dual-vector wheel and the conduit.

FIG. 5 shows a top view projection of a roller 24 positioned inside the conduit 13. The continuous contact path 70 represents the sinuous path of contact formed between a roller 24 and the inside surface 26 of the conduit 13 as the roller rotates about its axis b—b and as the wheel feeds in a screw-like manner axially through the conduit 13.

The following mathematical expressions may be used to describe the preferred shape of the profile of the rollers 24 as a radial function $z(x)$, where $z(x)$ represents the roller radius and "x" represents a distance from the center of the longitudinal axis b—b of the roller, as shown in FIG. 5. Any number of well known numerical methods may be applied to converge on $z(x)$. The function $z(x)$ may be described as:

$$z(x) = \Psi(z_0, x, R, e, b), \text{ when } z_0 = z(x)$$

where $z_0$=converged value of $z(x)$ such that $z_0 = z(x)$

R=radius of dual-vector wheel;

e=roller angle relative to plane of dual-vector wheel, where the plane of the dual-vector wheel is perpendicular to its axis of rotation, i.e., axis a—a of FIG. 1; and b=roller radius at midpoint (x=0).

Figure 6:
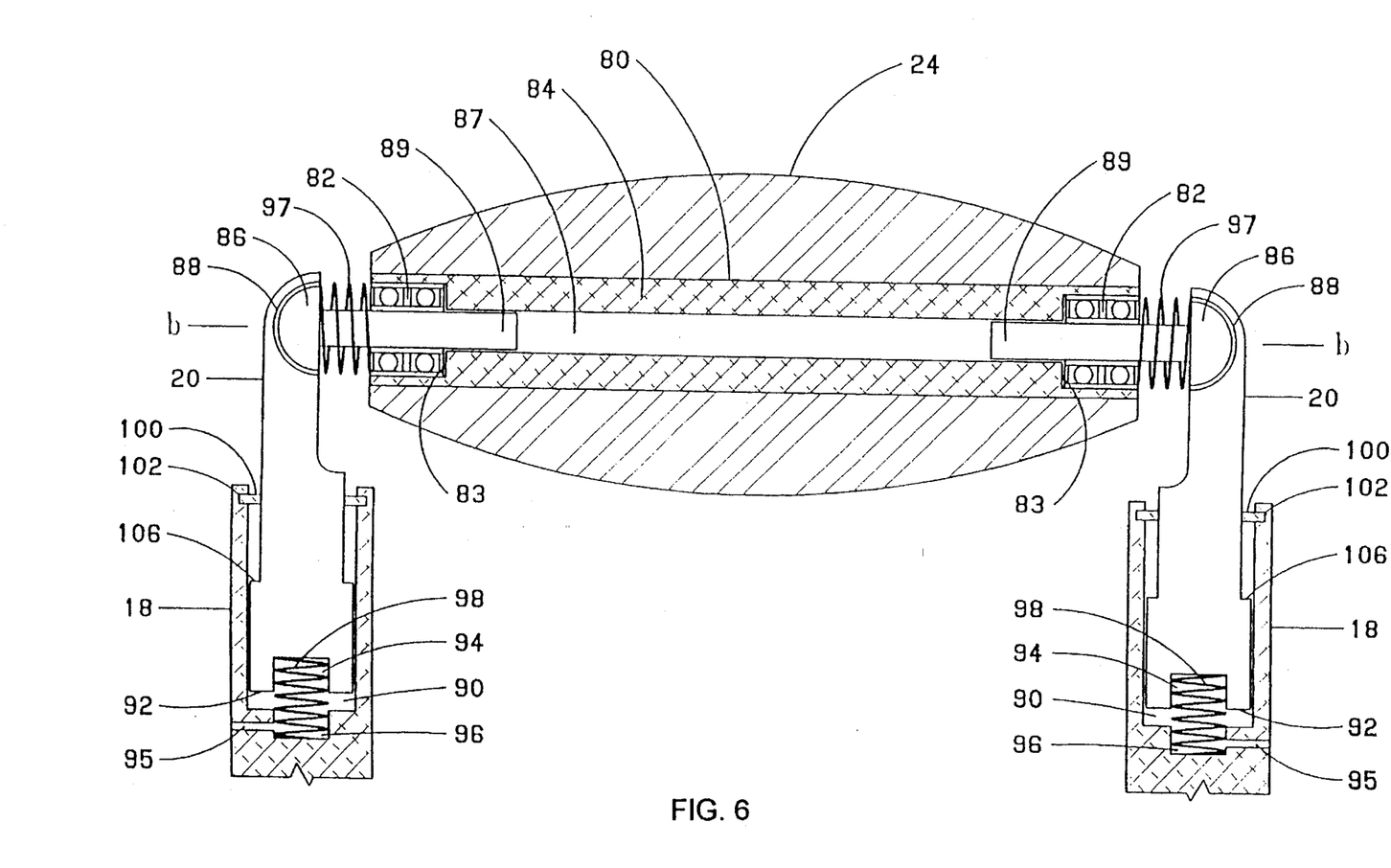
FIG. 6 is a cross-sectional view showing a roller supported by pin support brackets extended equal distances.
Figure 7:
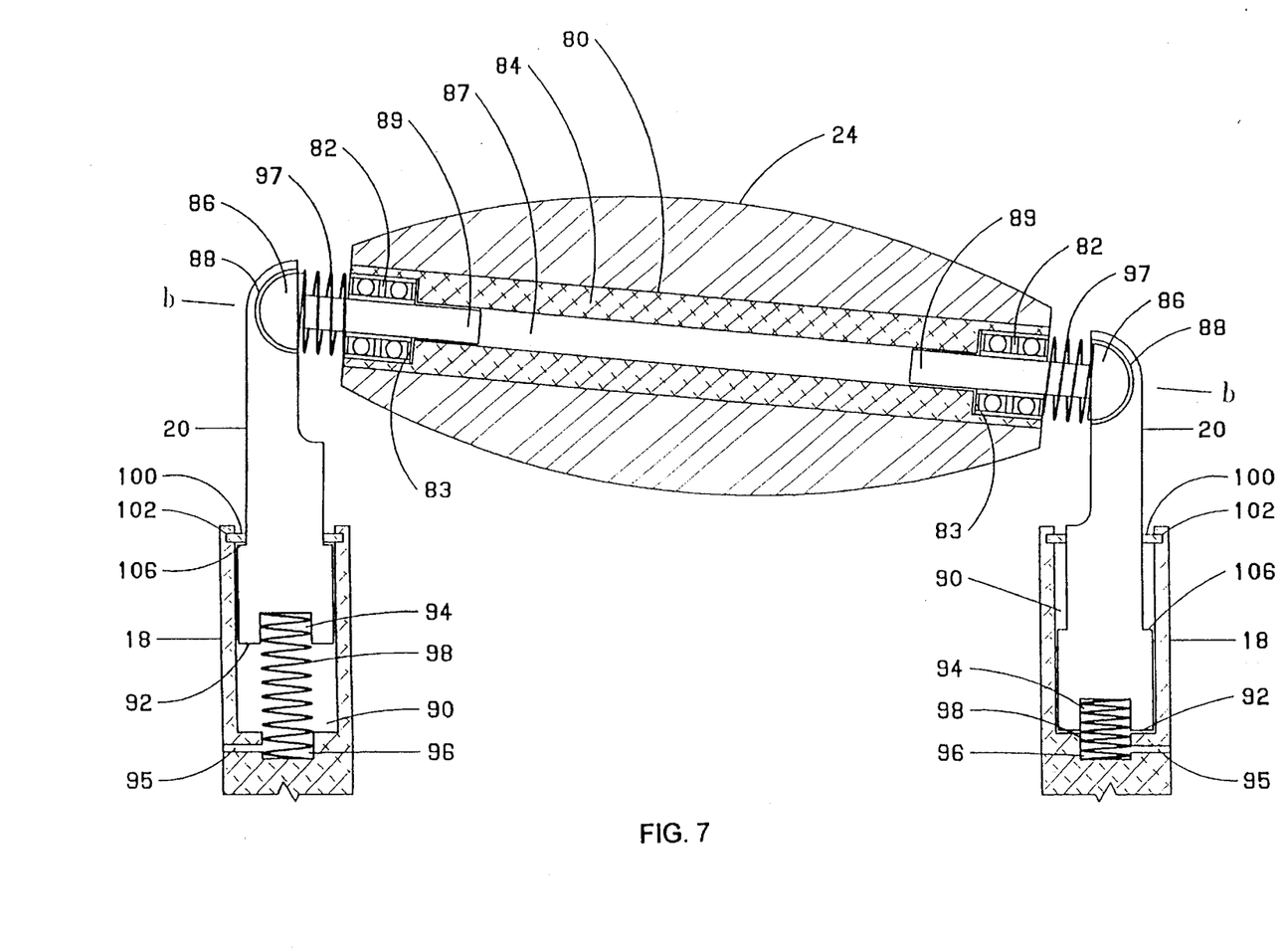
FIG. 7 is a cross-sectional view showing a roller supported by pin support brackets extended unequal distances.
Figure 8:
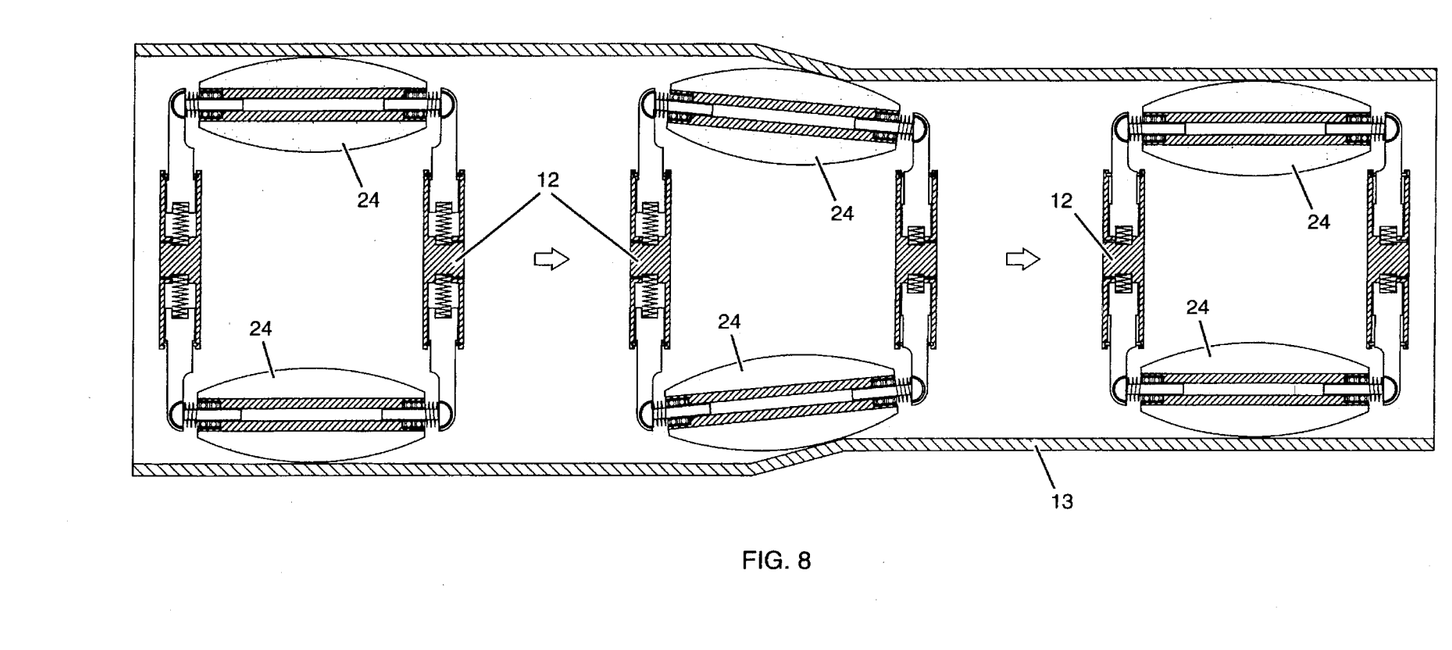
FIG. 8 is a cross-sectional view of a single dual-vector wheel traversing through a conduit which transitions from one inside diameter to another.

The formulas which may be used for calculating the roller profile are as follows:

$$\Psi(z_0, x, R, e, b) = \left[ \frac{A_3^3}{27} + \frac{B_3^2}{4} \right]$$

where $A_3 = \left[ B_2 - \frac{A_2^2}{3} \right]$, $B_3 = \left[ \frac{(2A_2^2 - 9A_2B_2 + 27C_2)}{27} \right]$ where $A_2 = [-B_1]$, $B_2 = [A_1C_1 - 4D_1]$, $C_2 = [D_1(4B_1 - A_1^2) - C_1^2]$ where $A_1 = \left[ \frac{V_3}{V_4} \right]$, $B_1 = \left[ \frac{V_2}{V_4} \right]$, $C_1 = \left[ \frac{V_1}{V_4} \right]$, $D_1 = \left[ \frac{V_0}{V_4} \right]$ where $V_0 = \left[ A^2 \left( \frac{(F(A^2(F-2) + 2R^2) + A^2 - 2R^2)}{(2x\cos(e))^2} + \frac{(F-1)}{2} \right) + M \right]$ where $M = R^2 \left( \frac{R}{2x\cos(e)} \right)^2 - \frac{1}{2} + \left( \frac{x\cos(e)}{2} \right)^2$ $V_1 = \left[ C \left( \frac{(A^2(1-F) - R^2)}{(x\cos(e))^2} \right) \sin^2(e) - 1 \right]$ $V_2 = \left[ \sin^2(e) \left( \frac{1}{2} + \frac{(R^2 - A^2 + C^2(3\sin^2(e) - 1))}{2(x\cos(e))^2} \right) + \frac{(A^2 - R^2)}{2(x\cos(e))^2} + \frac{1}{2} \right]$ $V_3 = \left[ C(1 - \sin^2(e)) \left( \frac{\sin(e)}{x\cos(e)} \right)^2 \right]$ $V_4 = \left[ \frac{(1 + \sin^2(e)(\sin^2(e) - 2))}{(2x\cos(e))^2} \right]$ where $C = [R - b]$ $A = [z_0 \sin(e)]$ $F = \left[ \left( \frac{C}{z_0} \right)^2 \right]$ FIG. 6 illustrates details of the extendable pin support brackets 20 which allow the roller 24, shown in cross-section in FIGS. 7 and 8, to be maintained in good contact against the inside surface 26 of the conduit 13. The roller 24 has a longitudinal bore 80 through which a tube 84 having a bore 87 is fitted. Bearings 82 fitted against lands 83 formed within the ends of the tube 84 are positioned so that the bearings are flush with each end of the roller 24. Pins 89 having semicircular, disk-shaped bearing ends 86 are fitted into each bearing 82 so that the rollers may rotate about the pins 89, and therefore, about axis b—b. The bearing ends 86 are supported in semicircular, disk-shaped bearing sockets 88 formed in the exposed ends of each pin support bracket 20. A coil spring 97 fitted over each pin 89 and compressed between the bearings 82 and 86 centers each roller 24 between the corresponding pair of pin support brackets 20.

Each pin support bracket 20 may slide within a bore 90 formed in the hub assembly 18. The inside end 92 of the pin support bracket 20 is fitted with a bore 94 extending a short distance into the pin support bracket. The bottom of the bore 90 includes a short bore 96, preferably having the same diameter as the bore 94. A coil spring 98 is fitted within with bores 94 and 96. The spring 98 provides a force which tends to force the pin support bracket 20 to slide out of the bore 90. An internal expanding C-shaped ring 100 is fitted within a groove 102 formed in the outer end of the bore 90. The pin support bracket 20 has a land 106 which provides a stopping surface which is urged by the spring 98 against the ring 100 to retain the pin support bracket within the bore 90.

Each pin support bracket 20 may independently slide inwardly and outwardly with respect to the bore 90. The combination of the spring biased, sliding pin support brackets 20, as well as the bearings 86 and sockets 88, and suitably compressible roller material such as a hard rubber compound, together allow good contact to be maintained between the rollers 24 and the inside surface 26 of the conduit 13. For example, FIG. 6 shows a roller 24 fitted within the conduit 13 where the pin support brackets 20 are extended equal amounts. FIG. 7 shows a roller fitted within the conduit 13 where the pin support brackets 20 are extended unequal amounts, as for example, in the case where the inside diameter of the conduit 13 changes, as shown in FIG. 8. The extendable pin support brackets 20 provide the wheel 12 with a variable outside diameter, thereby providing the internal conduit vehicle 10 with the capacity to be driven through conduits having varying inside diameters.

The hub assembly 18 also includes a bore 95 so that the bore 90 may be in gas communication with the atmosphere so that air within the bore 90 does not become compressed as the pin support bracket 20 slides toward bore 96. A roller 24, pins 89, bearings 82, bearing 86, disk-shaped socket 88, pin support bracket 20, tube 84, and springs 97 and 98 together comprise what may be referred to as a roller set.

Obviously, many modifications and variations of the present invention are possible in light of the above teachings. For example, various types of inspection equipment such as a video camera system may be transported by the vehicle 10 to perform inspections of the inside of a pipe. The video camera may be RF linked or linked by a cable to some remote receiver. It is therefore to be understood that within the scope of the appended claims, the invention may be practiced otherwise than as specifically described.

I claim:

1. An internal conduit vehicle, comprising:

a chassis;

coaxially aligned first and second dual-vector wheels mounted to said chassis, each said dual-vector wheel comprising:

a hub assembly having multiple bores;

multiple rollers pivotally mounted about said hub assembly, each said roller having a prolate spheroid-like shape;

multiple pairs of pin support brackets, each said pair of pin support brackets pivotably supporting one of said rollers, and each pin support bracket mounted to slide within one of said bores of said hub assembly; and motor means mounted to said chassis for rotating said first and second dual-vector wheels.

2. The internal conduit vehicle of claim 1 wherein said motor means includes a motor control circuit for controlling first and second motors so that said first dual-vector wheel rotates in a first direction and said second dual-vector wheel rotates in a second direction opposite said first direction.

3. The internal conduit vehicle of claim 1 wherein said hub assembly includes springs positioning said rollers between one of said pairs of pivot support brackets.

4. An internal conduit vehicle system, comprising:

a conduit having an inside surface;

an internal conduit vehicle, comprising:

a chassis;

coaxially aligned first and second dual-vector wheels mounted to said chassis, each said dual-vector wheel comprising:

a hub assembly having multiple bores;

multiple rollers pivotally mounted about said hub assembly, each said roller having a prolate spheroid-like shape;

multiple pairs of pin support brackets, each said pair of pin support brackets pivotally supporting one of said rollers, and each pin support bracket mounted to slide within one of said bores of said hub assembly; and motor means mounted to said chassis for rotating said first and second dual-vector wheels.

5. A dual-vector wheel, comprising:

a hub having multiple bores;

multiple rollers pivotally mounted about said hub, each said roller having a prolate spheroid-like shape;

multiple pairs of pin support brackets, each said pair of pin support brackets pivotally supporting one of said rollers, and each pin support bracket mounted to slide within one of said bores of said hub; and motor means mounted to said hub.

* * * * *